US008287128B2

(12) United States Patent
Lescure et al.

(10) Patent No.: US 8,287,128 B2
(45) Date of Patent: Oct. 16, 2012

(54) LASER PROJECTION SOURCE WITH POLARIZATION DIVERSITY ELEMENT FOR SPECKLE REDUCTION

(75) Inventors: Alban N. Lescure, Redmond, WA (US); Markus Duelli, Seattle, WA (US); Mark O. Freeman, Snohomish, WA (US); Witold R. Teller, Pullman, WA (US)

(73) Assignee: Microvision, Inc., Redmond, WA (US)

( * ) Notice: Subject to any disclaimer, the term of this patent is extended or adjusted under 35 U.S.C. 154(b) by 481 days.

(21) Appl. No.: 12/573,563

(22) Filed: Oct. 5, 2009

(65) Prior Publication Data
US 2010/0265467 A1    Oct. 21, 2010

Related U.S. Application Data

(63) Continuation-in-part of application No. 12/424,951, filed on Apr. 16, 2009, now Pat. No. 8,049,825.

(51) Int. Cl.
 *G03B 21/14* (2006.01)
(52) U.S. Cl. ........................................................ 353/20
(58) Field of Classification Search ................ 353/20, 353/30, 31, 75, 84, 97; 348/210.99, 266
See application file for complete search history.

(56) References Cited

U.S. PATENT DOCUMENTS

| 6,175,398 | B1 * | 1/2001 | Yamada et al. | 349/96 |
| 2003/0142288 | A1 * | 7/2003 | Kinrot et al. | 356/28 |
| 2007/0153235 | A1 * | 7/2007 | Morikawa et al. | 353/20 |
| 2008/0158513 | A1 | 7/2008 | Bartlett et al. | |
| 2009/0034041 | A1 | 2/2009 | Grasser | |
| 2009/0046548 | A1 * | 2/2009 | Katayama | 369/44.32 |
| 2009/0161072 | A1 | 6/2009 | Yamauchi et al. | |
| 2010/0079848 | A1 | 4/2010 | Grasser et al. | |
| 2010/0231861 | A1 * | 9/2010 | Mizushima et al. | 353/20 |
| 2011/0037953 | A1 | 2/2011 | Nizani et al. | |

FOREIGN PATENT DOCUMENTS
WO    WO 2007138940 A1 *  12/2007

OTHER PUBLICATIONS

Dingel, Benjamin et al., "Speckle-Free Image in a Laser Diode Microscope by Using the Optical Feedback Effect", *Optical Letters*, vol. 18, No. 7 Apr. 1, 1993, 549-551.
Jones, R. J. et al., "Influence on External Cavity Length on the Coherence Collapse Regime in Laser Diodes Subject to Optical Feedback", *IEE Proc-Optoelectron*, vol. 148, No. 1 Feb. 1, 2001, 7-12.
Trisnadi, Jahja I. et al., "Speckle Contrast Reduction in Laser Projection Displays", *SPIE* vol. 4657 Apr. 26, 2002.

(Continued)

*Primary Examiner* — Thanh Luu
*Assistant Examiner* — Danell L Owens
(74) *Attorney, Agent, or Firm* — Kevin D. Wills

(57) ABSTRACT

An imaging system (200), such as a scanned laser projection system, includes one or more laser sources (201) configured to produce one or more light beams (204), and a light modulator (203) configured to produce images (206) from the light beams (204). A polarization diversity element (221), which can be manufactured from a birefringent material or from a polymerized liquid crystal layer, is disposed within the imaging system (200). The polarization diversity element (221) is configured to alter the polarization of an incident beam to create a transmitted beam comprising diverse polarization patterns, thereby reducing speckle in projected images.

5 Claims, 12 Drawing Sheets

OTHER PUBLICATIONS

Volker, A.C. et al., "Laser Speckle Imaging with An Active Noise Reduction Scheme", *Optics Express*, vol. 13, No. 24, Nov. 15, 2005. 9782-9787.

Woodward, S. L. et al., "The Onset of Coherence Collapse in DBR Lasers", *IEEE Photonics Technology Letters*, vol. 2, No. 6 Jun. 1, 1990, 391-394.

* cited by examiner

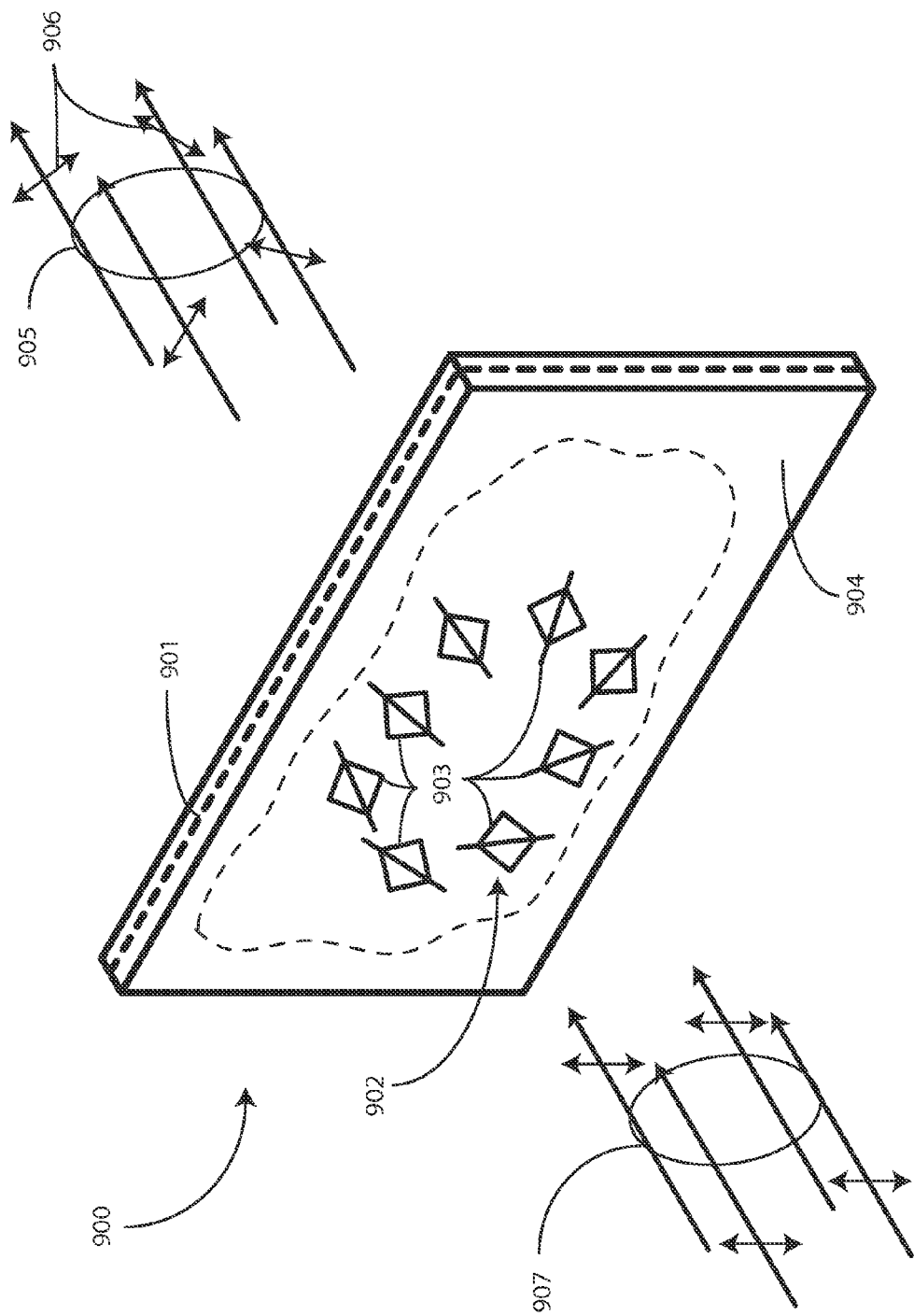

LASER PROJECTION SOURCE WITH POLARIZATION DIVERSITY ELEMENT FOR SPECKLE REDUCTION

CROSS REFERENCE TO PRIOR APPLICATIONS

This application is a continuation-in-part of U.S. application Ser. No. 12/424,951, filed Apr. 16, 2009, which is incorporated by reference for all purposes.

BACKGROUND

1. Technical Field

This invention relates generally to optical projection systems configured to reduce perceived speckle, and more particularly to a laser-based or other type of imaging system employing a polarization diversity element disposed along the optical path of one or more light sources to create mixed polarization light beams from an incident light beam, thereby reducing speckle in projected images as perceived by a viewer.

2. Background Art

Modern projection systems, such as scanned-laser projection systems, facilitate the production of brilliant images created with vibrant colors. The image quality associated with both laser-based and other types of projection systems is continually being improved with advances in technology. Projection systems are becoming smaller and more compact, with some systems being small enough to fit easily into a portable electronic device such as a mobile telephone. Additionally, the power required to produce brilliant images is continually decreasing. Projection systems are becoming less expensive to manufacture as well.

One practical drawback associated with some projection systems is an image artifact known as "speckle." Speckle occurs when a coherent light source is projected onto a randomly diffusing surface. As lasers generate coherent light, speckle can be prevalent in laser-based systems. However, the problem is not limited to laser-based systems, as it can also appear in conjunction with the light sources used in digital light projection systems and liquid crystal on silicon systems as well.

When a coherent light source is used, components of the light combine with other components when the light reflects off a rough surface. This combining works to form patches of higher intensity light and lower intensity light due to the resulting constructive and deconstructive interference. In an image detector with a finite aperture, such as a human eye, these varied patches of intensity appear as optical "speckles," as some small portions of the image look brighter than other small portions. Further, this spot-to-spot intensity difference can vary depending on observer's position, which makes the speckles appear to change when the observer moves.

Turning now to FIG. 1, illustrated therein is a prior art system 100 in which an observer 102 may perceive speckle. Specifically, a coherent light source 101, which for discussion purposes will be a semiconductor-type or standard laser, delivers a coherent beam 104 to a modulation device 103. The modulation device 103 modulates the coherent beam 104 into a modulated coherent beam 105 capable of forming an image. This modulated coherent beam 105 is then delivered to a projection medium, such as the projection screen 107 shown in FIG. 1.

As the projection screen 107 surface has a random roughness, i.e., as it includes tiny bumps and crevices that are randomly distributed, the reflected light 108 has portions that combine and portions that cancel. As a result, the observer 102 views an image 106 that appears to be speckled. The presence of speckle often tends to perceptibly degrade the quality of the image produced using the laser projection system.

There is thus a need for an improved speckle-reducing system for use with image projection systems.

BRIEF DESCRIPTION OF THE DRAWINGS

FIG. 9 illustrates another polarization diversity element in accordance with embodiments of the invention.

Figure 1:
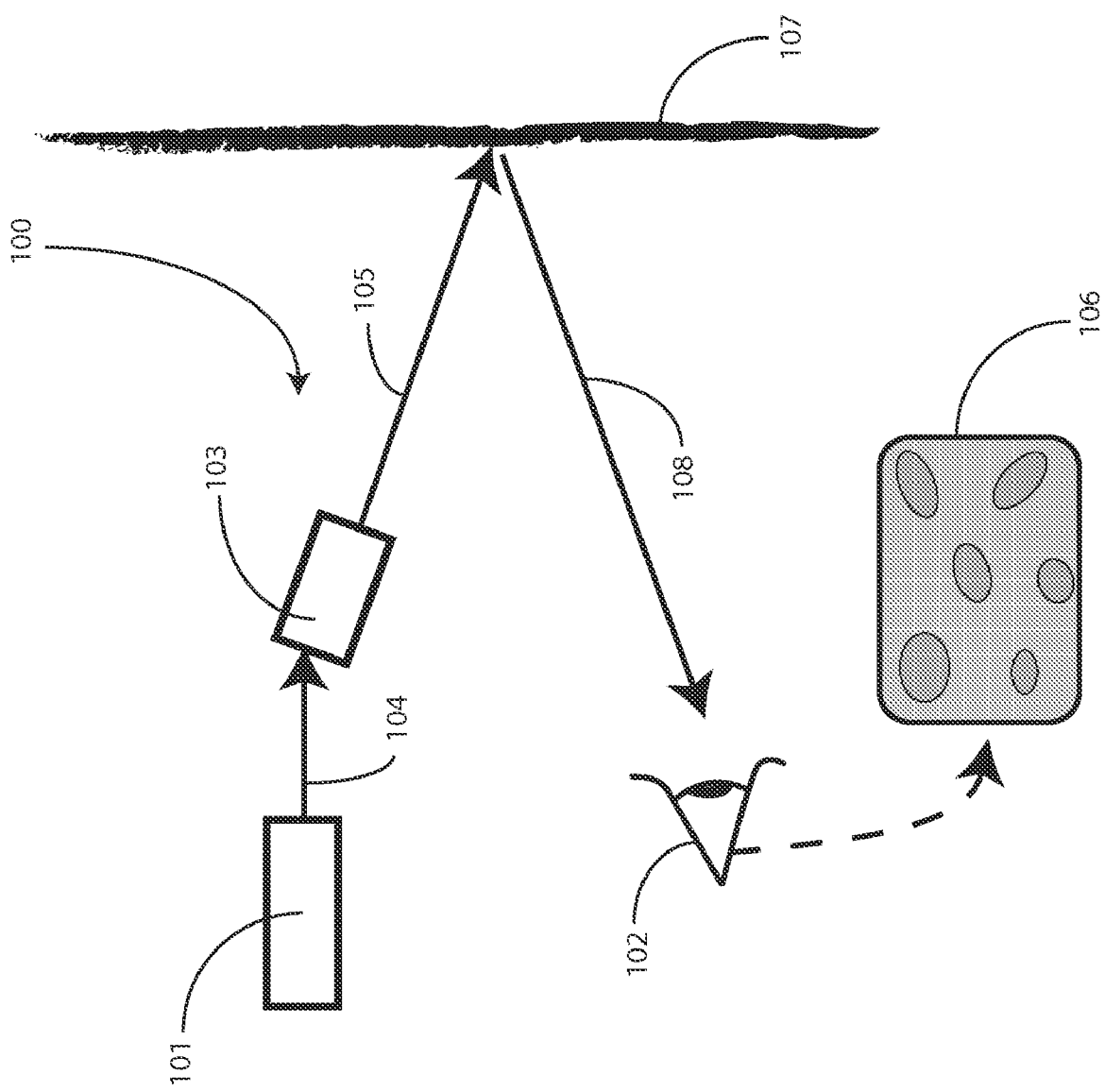
FIG. 1 illustrates a prior art image projection system exhibiting speckle characteristics.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an imaging system configured to reduce perceived speckle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of projecting images and reducing speckle as described herein. The non-processor circuits may include, but are not limited to, microprocessors with software configured to control the microprocessors to receive image data and project images on a display surface, scanning mirrors, drivers, image modulation devices, memory devices, clock circuits, power circuits, and so forth. As such, these functions may be interpreted as steps of a method to produce images or perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention employ a polarization diversity element, which may be manufactured from a birefringent material or a polymerized liquid crystal material. The polarization diversity element is disposed along an optical axis within an image projection system to modulate portions of a received beam and create a transmitted beam having diverse polarization beam components therein.

As is known in the art, any polarization state can be decomposed into the sum of two orthogonal polarizations. When light is incident upon the polarization diversity element in accordance with embodiments of the present invention, the polarization diversity element "mixes" polarization of portions of the beam. The output of the polarization diversity element therefore also consists of a mixture of two orthogonal polarizations. However, the proportional amount and phase of each orthogonal polarization varies across the output. The transmitted beam thus includes portions having a first polarization, portions having a second polarization, portions having a third polarization, and so forth.

By way of example, one polarization diversity element in accordance with embodiments of the invention can be configured to create an output beam where a portion of the beam the polarization is a horizontal linear polarization while another part of the beam is a vertical linear polarization. Yet another portion of the beam can be an elliptical polarization. This is but one illustrative example. It will be clear to those of ordinary skill in the art aving the benefit of this disclosure that other polarization combinations can also be generated. The "polarization diversity" in the output beam of embodiments of the present invention works to reduce speckle in the resulting image, as orthogonally polarized laser beams from the same laser source do not generally interfere with each other, even when reflected from a non-uniform surface. The polarization diversity element delivers highly effective speckle reduction with a single, passive, static, optical element.

Polarization diversity is created in the polarization diversity element by a spatially varying polarization alteration pattern. More specifically, the polarization diversity elements in accordance with embodiments of the invention are configured to have either a spatially varying pattern of optically retarding elements, or a spatially varying pattern of optically oriented elements, across a major face of the polarization diversity element.

For example, where the polarization diversity element is configured as a layer of birefringent material, such as quartz or calcite, the spatially varying polarization alteration pattern will be configured as a spatially varying pattern of optically retarding elements, with each element comprising crystals or other portions of the birefringent material. The spatially varying polarization alteration pattern can be configured by varying the thickness of the birefringent layer. This results in a variation of an optical path length difference between the ordinary and extraordinary axes of the birefringent layer across the major face of the polarization diversity element.

In one embodiment, a major face or surface of the birefringent material can be configured to provide a linear variation of the optical path length difference between the ordinary and extraordinary axes. In another embodiment, the major face of the birefringent material can be configured to be non-linear, which results in a non-linear spatial variation of the polarization alteration pattern. Other variations can be used as well, including random variations, vortex-type variations, and Hermite-Gaussian phase pattern variations.

In one embodiment, when a birefringent material is used as the polarization diversity element, a compensating, non-birefringent optical element can be used in conjunction with the birefringent layer to correct any beam aberrations introduced by the birefringent material. In one embodiment, this compensating element can be manufactured from an isotropic material such as glass. When used with a compensating element, the polarization diversity element becomes a "compensated birefringent element."

Where the polarization diversity element is configured as a polymerized liquid crystal layer, the varying polarization alteration pattern can be obtained by varying the optical axis orientation—along the major face of the polarization diversity element—of the mesogens comprised in the polymerized liquid crystal. The use of a polymerized liquid crystal layer obviates the need for altering the thickness of the polarization diversity element, as the mesogens can be oriented in accordance with the polarization alteration pattern without changing the thickness of the polymerized liquid crystal layer.

As with the birefringent layer described above, the polarization alteration pattern of the polymerized liquid crystal layer can vary linearly, non-linearly, randomly, or in accordance with other functions across the major face of the polarization diversity element. For example, the polarization alteration pattern of the polymerized liquid crystal layer can be vortex-based, or Hermite-Gaussian phase pattern-based, as will be described below. Where the polarization diversity element is configured as a polymerized liquid crystal layer, a compensating element is generally not required as orientations of the mesogens or molecules of the polymerized liquid crystal layer vary while the outer interface surfaces of the polarization diversity element are generally flat, planar, and substantially parallel, optically transparent layers. The polarization diversity elements of embodiments of the present invention, whether they be manufactured from birefringent materials or from polymerized liquid crystal, offer a passive, readily manufacturable, simple solution to reducing speckle caused by a single laser source, multiple laser sources, or other types of light projecting sources.

Embodiments of the present invention offer many advantages over prior art speckle reduction techniques. To begin, the polarization diversity elements described herein can be manufactured in a very compact form factor. To illustrate by using the birefringent layer as an example, in one embodiment a birefringent layer made of crystal quartz (SiO.sub.2) or calcite having major face dimensions of approximately three millimeters by three millimeters, with a thickness averaging approximately one millimeter, can be used with a laser-based projection system, such as a Microelectromechanical (MEMS) laser projection system.

Where the polymerized liquid crystal layer is used, the layer can be inexpensively manufactured by depositing a liquid crystal material having mesogens on a substrate and rotating the mesogens to match the spatially varying polarization alteration pattern. For instance, an electric field can then be applied to the liquid crystal material, with the potential of the electric field varying in accordance with the polarization alteration pattern such that the orientation of each mesogen varies across the major face of the polarization diversity element. While this electric field is being applied, the liquid crystal material can be polymerized with ultraviolet light, or heat, or other methods, thereby fixing the orientations of each mesogen in the polymer. When this is done, the polymerized liquid crystal element functions similarly to the birefringent layer described above, although it is the optical axis orientation of each mesogen that varies rather than the optical thickness, as would be the case in a device manufactured from a birefringent material.

Another advantage of embodiments of the present invention is that polarization diversity elements configured as described herein do not adversely affect the large depth of focus offered by some projection systems, such as those using laser light sources. By way of example, MEMS based laser projection systems, such as those manufactured by Microvision, Inc., have a depth of focus that is tens of meters long. By incorporating a polarization diversity element in accordance with embodiments of the invention, this depth of focus is not substantially affected.

Another advantage offered by embodiments of the present invention is that the overall brightness of the laser projection system is not adversely affected by the inclusion of a polarization diversity element with optical coatings disposed along major faces the respective device. An additional advantage is that the polarization diversity element is compact and simple, and does not introduce additional moving parts. Further, the polarization diversity element does not require energy to function. Next, polarization diversity elements in accordance with embodiments of the invention can further be readily mounted on printed circuit boards—either by way of adhesives or by mechanical carriers—and can be used with semiconductor type laser sources. Additionally, other components of the system do not need to be substantially altered to function with the polarization diversity elements described herein. For example, when using a polarization diversity element in a MEMS-scanner-based laser projection system, the dimensions of the scanner mirror do not need to be changed as the overall size of the beam being delivered to the mirror does not change significantly.

One other advantage of embodiments of the present invention is that a laser projection source employing a polarization diversity element as described herein can be used with other speckle mitigation techniques, such as, but not limited to, wavelength diversity or frame-to-frame averaging of uncorrelated speckle patterns techniques. For example, a laser projection system using a polarization diversity element in accordance with embodiments of the present invention can be used with modules configured to alter successive frames of the images created by the light modulator, such as polarization switching modules, transverse phase modulation modules, or laser sources that are driven by high speed modulation devices.

Figure 2:
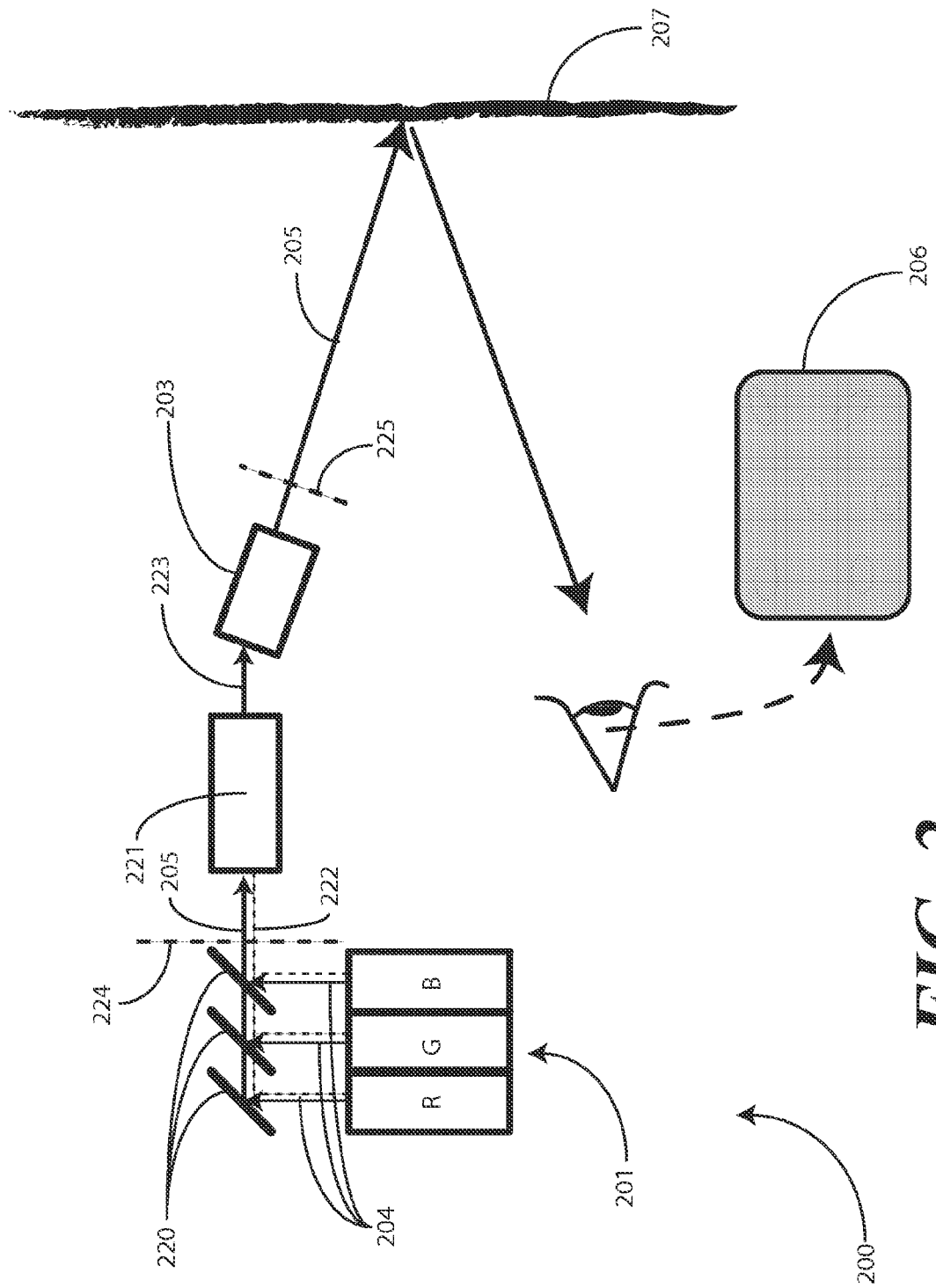
FIG. 2 illustrates one embodiment of a speckle reduction system in accordance with embodiments of the present invention.

Turning now to FIG. 2, illustrated therein is a general block diagram of a speckle-reducing scanned laser imaging system 200 in accordance with embodiments of the invention. While a scanned laser system will be used herein for illustration and discussion, it will be clear to those of ordinary skill in the art having the benefit of this disclosure that embodiments of the invention may also be used with other types of image generation techniques, including digital light projection systems and liquid crystal on silicon projection systems, as scanned lasers may be used as light sources in these systems as well.

In FIG. 2, one or more laser sources 201 are configured to produce a plurality of light beams 204. In one embodiment, the one or more laser sources 201 comprise a red laser, a blue laser, and a green laser, as indicated by the "R," "G," and "B" in the illustrative embodiment of FIG. 2. These lasers can be various types of lasers. For example, in one embodiment, the one or more laser sources 201 comprise edge-emitting lasers. In another embodiment, the one or more lasers sources 201 comprise vertical cavity surface emitting lasers. Such semiconductor lasers are well known in the art and are commonly available from a variety of manufacturers.

To facilitate freedom of design, i.e., to permit the designer to orient the one or more laser sources 201 in different ways relative to the light modulator 203, one or more optical alignment devices 220 can be used to direct light beams 204 from the one or more laser sources 201. The one or more optical alignment devices 220, in one embodiment, are used to orient the plurality of light beams 204 into a single light beam 205. Where the one or more laser sources 201 comprise a red laser, blue laser, and green laser, the one or more optical alignment devices 220 can blend the output of each laser to form a coherent beam of white light. In accordance with one embodiment of the invention, this combined light beam 205 is circularly polarized. In accordance with another embodiment of the invention, the combined light beam 205 is linearly polarized.

In one embodiment, dichroic mirrors are used as the one or more optical alignment devices 220. The dichroic mirrors are used to orient the plurality of light beams 204 into the combined light beam 205. Dichroic mirrors are partially reflective mirrors that include dichroic filters that selectively pass light in a narrow wavelength bandwidth while reflecting others. In one embodiment, polarizing coatings can be incorporated into the dichroic mirrors where the combined light beam 205 is linear polarized. Note that the location, as well as the number, of the optical alignment devices 220 can vary based upon application. Alternatively, some applications may not require optical alignment devices 220.

A light modulator 203 is then configured to produce images 206 by modulating the combined light beam and delivering it to a display surface 207. In one embodiment, the light modulator 203 comprises a MEMS scanning mirror. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference.

A polarization diversity element 221 is disposed along an optical path 222 of the combined light beam 205. The polarization diversity element 221 comprises a spatially varying alteration pattern along a major face that is configured to alter polarizations of portions of the combined light beam 205 to create one or more transmitted beams 223 having diverse polarizations so as to reduce speckle appearing when images 206 are displayed on a display surface 207.

In the illustrative embodiment of FIG. 2, the polarization diversity element can be either a birefringent material layer or a polymerized liquid crystal layer. As will be described below, in one embodiment the polarization diversity element 221 is a compensated birefringent layer in that an isotropic, and therefore non-birefringent, compensating device is used to correct any aberrations introduced by the birefringent material.

In accordance with embodiments of the invention, the polarization diversity element 221 can be placed at varying locations within the imaging system 200. In one embodiment, the polarization diversity element 221 can be disposed along the pupil plane 224 of the imaging system 200. In another embodiment, the polarization diversity element 221 can be disposed along the image plane 225 of the imaging system 200. Where, for example, the imaging system 200 is a scanned-laser display system, the polarization diversity element 221 can be placed either along the pupil plane 224 or along the image plane 225. However, where the imaging system 200 is a digital light projection system or a liquid crystal on silicon system, the polarization diversity element 221 can be placed along the pupil plane, i.e., the plane of the projection lens.

Figure 3:
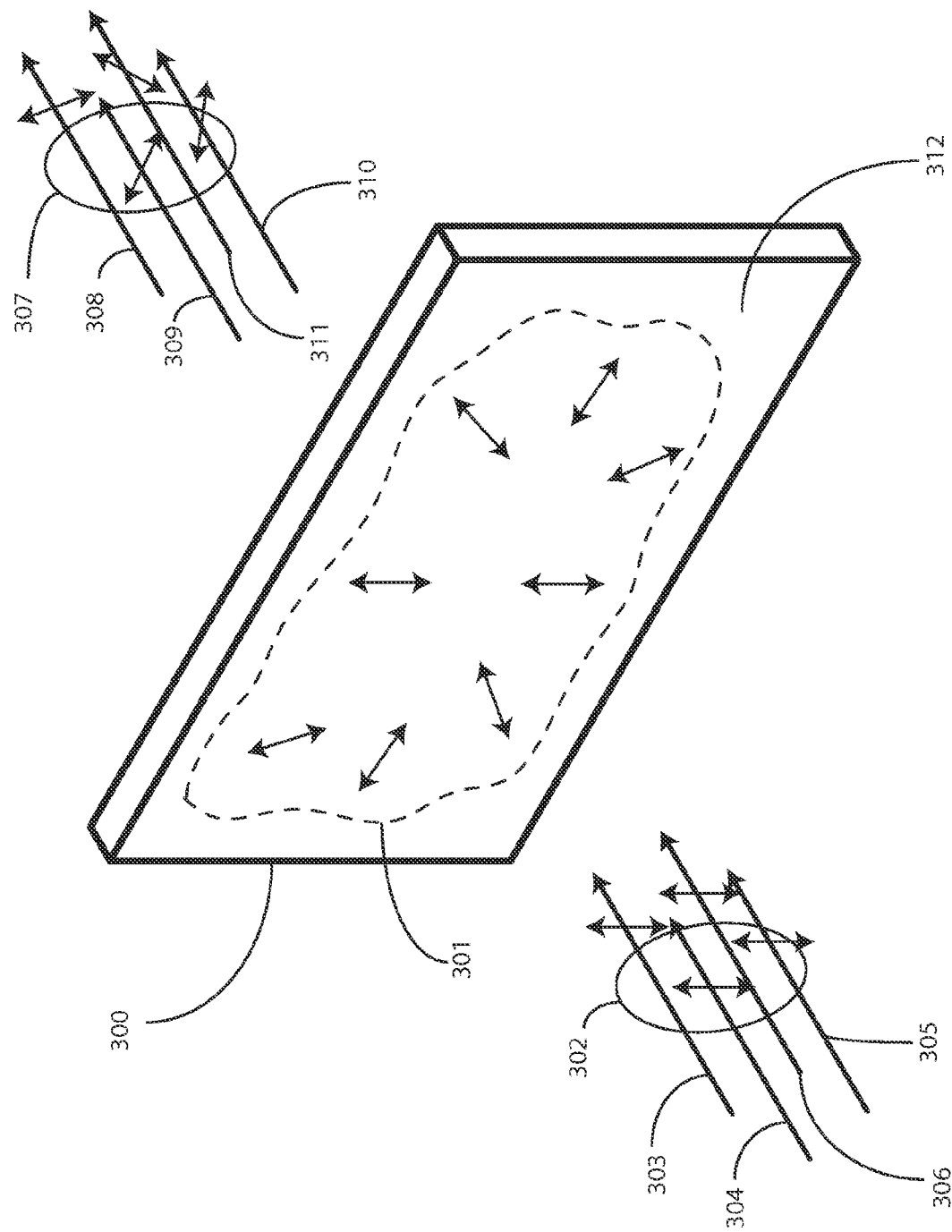
FIG. 3 illustrates a general embodiment of a polarization diversity element in accordance with embodiments of the invention.

Turning now to FIG. 3, illustrated therein is a general embodiment of a polarization diversity element 300 suitable for use with embodiments of the invention to reduce speckle in imaging systems. As noted above, the polarization diversity element 300 may be manufactured from a birefringent material, as will be described in FIGS. 4-6. Alternatively, the polarization diversity element 300 may be manufactured from polymerized liquid crystals as will be described in FIGS. 9-11.

The polarization diversity element 300 includes a spatially varying polarization alteration pattern 301 that is configured to alter a polarization of portions 303,304,305,306 of an incident light beam 302 to create a transmitted beam 307 comprising portions 308,309,310,311 having diverse polarizations. Said differently, the polarization diversity element 300 alters the polarizations of portions 303,304,305,306 of the input beam in accordance with the spatially varying polarization alteration pattern 301, such that the portions 308,309, 310,311 of the transmitted beam 307 have different, mixed, polarizations. This "mixed polarization" transmitted beam 307 works to reduce speckle because the homogenous polarization of the incident beam 302 has become heterogeneous in the transmitted beam 307 in accordance with the spatially varying polarization alteration pattern 301.

The spatially varying polarization alteration pattern 301 can be formed in a variety of ways. Where the polarization diversity element 300 is manufactured from a birefringent material such as quartz or calcite, the spatially varying polarization alteration pattern 301 will comprise a spatially varying pattern of thickness of optical retardation elements that alter the polarization of an incident, polarized, beam. This pattern can be formed in a birefringent material by linear or non-linear variation of the optical path length difference between the ordinary and extraordinary polarization axes across a major face 312 of the polarization diversity element 300. For example, a designer may vary the thickness of the polarization diversity element 300 across the major face 312 in a birefringent device to vary this optical path length difference by fabricating the spatially varying polarization alteration pattern 301 as a surface relief along a major face 312.

Figure 5:
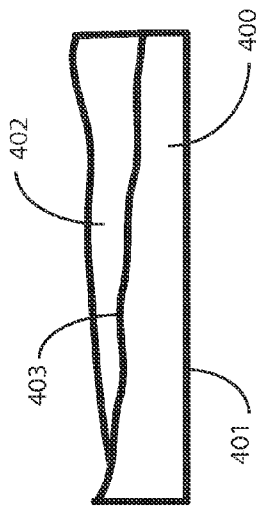
FIGS. 4-6 illustrate one polarization diversity element in accordance with embodiments of the invention.
Figure 6:
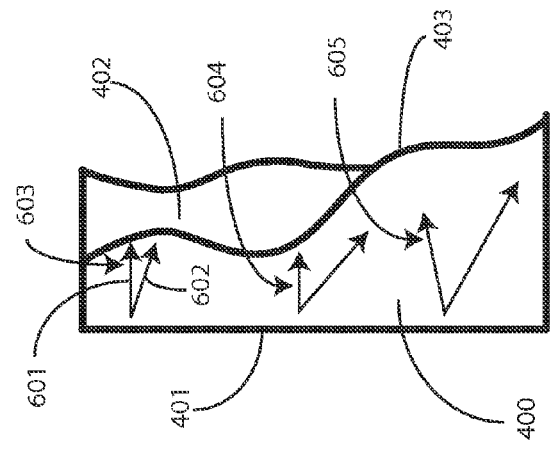
Figure 4:
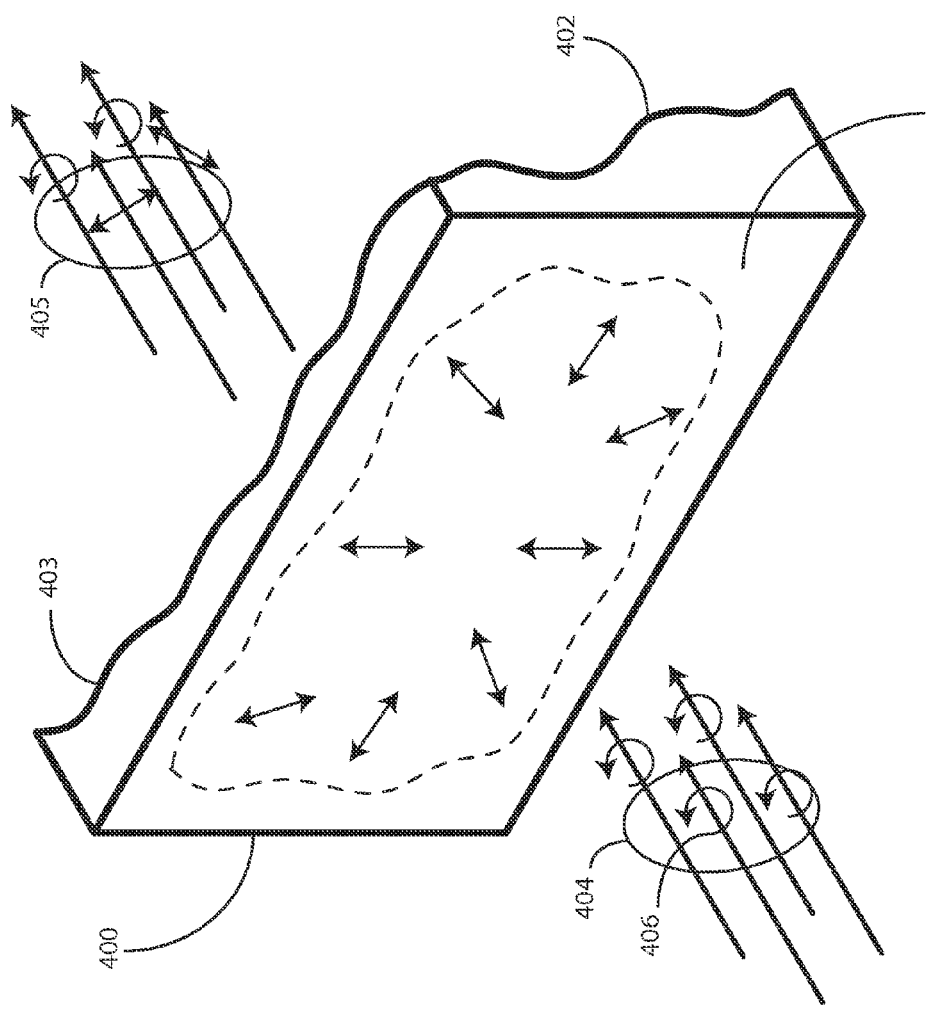

Turning now to FIGS. 4-6, illustrated therein is one such embodiment. Specifically, a polarization diversity element 400 manufactured from a birefringent material is shown. FIG. 4 illustrates a perspective view, while FIG. 5 shows a top, plan view and FIG. 6 shows a side, elevation view. The thickness variations of the polarization diversity element 400 can be seen in each view.

In one embodiment, the polarization diversity element 400 is a birefringent device made of quartz or calcite that includes a first major face 401 and a second major face 402. The second major face 402 is disposed opposite the polarization diversity element 400 relative to the first major face 401. In the embodiment of FIGS. 4-6, the spatially varying polarization alteration pattern (301) is fabricated as a surface relief pattern 403 along the second major face 402. As can be seen in FIG. 6, this surface relief pattern 403, which results in a varying thickness of the polarization diversity element 400 along the major faces 401,402, creates a variation of the optical path length difference between the ordinary axis 601 and the extraordinary axis 602 along the major faces 401,402. For instance, ordinary and extraordinary axis pair 603 has a first path length difference therebetween, while ordinary and extraordinary axis pair 604 has a second path length difference due to the different thickness. Similarly, ordinary and extraordinary axis pair 605 has a third path length difference. These different path length differences essentially create a varied optical retardance across the major faces 401,402, which results in a transmitted beam 405 having diverse polarization portions.

Note that while the thickness variations of the polarization diversity element 400 are shown in FIGS. 4-6 as being a non-linear variation of the optical path length difference between the ordinary polarization axis 601 and the extraordinary polarization axis 602 of the polarization diversity element 400, it will be clear to those of ordinary skill in the art having the benefit of this disclosure that the invention is not so limited. The thickness variations of the polarization diversity element 400 can also occur as a linear variation of the optical path length difference between the ordinary polarization axis 601 and the extraordinary polarization axis 602 of the polarization diversity element 400. Additionally, as will be shown in subsequent figures, the thickness variations can be in accordance with a vortex-type variation or Hermite-Gaussian phase patterns. Random patterns may also be used in some applications.

Figure 8:
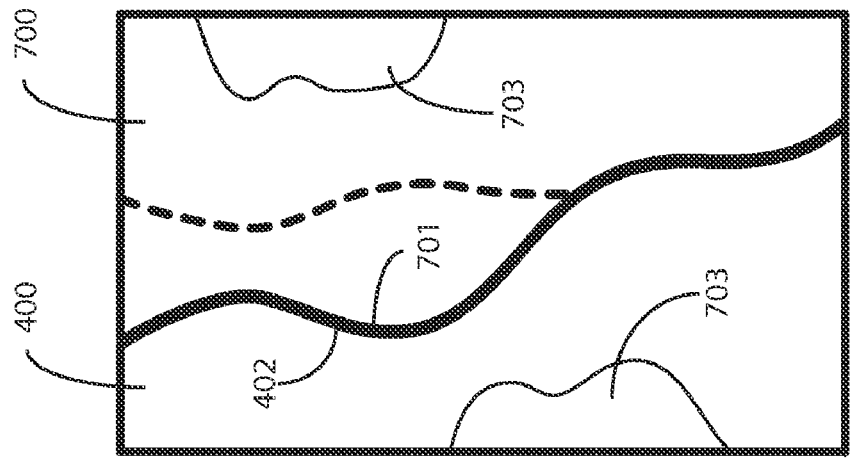
FIGS. 7-8 illustrate embodiments of compensated polarization diversity elements in accordance with embodiments of the invention.
Figure 7:
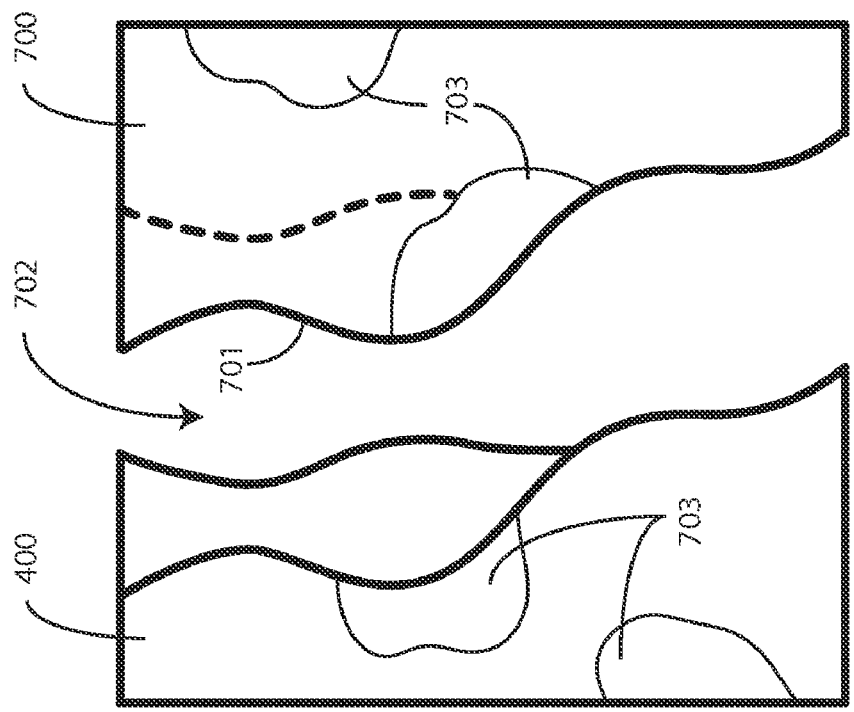

As noted above, embodiments of the present invention are well suited for use with laser-based projection systems. This is true because the incident beam 404 is highly coherent and polarized as it propagates through the image projection system. For example, in one embodiment, the incident beam 404, which is generated by a laser source in a laser projection system, is circularly polarized light 406. The circularly polarized light 406 is then split into polarized components by the spatially varying polarization alteration pattern.

Where a birefringent material is used to manufacture the polarization diversity element 400, it will frequently be necessary to employ a compensating, non-birefringent optical element to correct aberration or other optical path deviations introduced by the polarization diversity element 400. Turning now to FIGS. 7 and 8, illustrated therein are two embodiments of compensated polarization diversity elements in accordance with embodiments of the invention.

In FIGS. 7 and 8, a matched compensating element 700 is paired with the polarization diversity element 400. In one embodiment, the compensating element 700 is manufactured from an isotropic material such as borosilicate crown glass. In addition to correcting aberrations, the compensating element 700 can also help to prevent clipping artifacts in the resulting image.

In one embodiment, the compensating element 700 is disposed between the polarization diversity element 400 and the light modulator (203). In another embodiment, where optical alignment devices are used, and where the polarization diversity element 400 is disposed between an optical alignment device and a light source, such as a laser source, the compensating element 700 can be disposed between the polarization diversity element 400 and the optical alignment device.

As shown in both FIGS. 7 and 8, the compensating element 700 includes a major face 701 that is "matched" with the spatially varying polarization alteration pattern. Where the spatially varying alteration pattern is fabricated as a surface relief in a major face 402 of the polarization diversity element 400, the major face 701 of the compensating element can be matched by fabricating a complementary surface relief in the complementary major face 402. Alternatively, the compensating element 700 can be fabricated from a flat piece of isotropic material, such as glass, and affixed to the polarization diversity element 400 using a gap-filling isotropic adhesive such as an optical epoxy. In this manner, the complementary surface relief in the compensating element 700 is created automatically due to the ability of the optical epoxy to fill gaps and therefore become a complementary surface relief.

In accordance with embodiments of the invention, the physical relationship between compensating element 700 and the polarization diversity element 400 can be varied for optimization. Specifically, the physical relationship between the elements can be optimized according to dispersion caused by the polarization diversity element 400, and to correct for some chromatic differential steering effects. FIGS. 7 and 8 illustrate two of the many possible physical relationships that can exist between the compensating element 700 and the polarization diversity element 400. In addition to correcting aberrations, the compensating element 700 can also help to prevent clipping artifacts in the resulting image.

As shown in FIG. 7, in one embodiment the polarization diversity element 400 and compensating element 700 are disposed such that they are separated by an air gap 702. In separating the polarization diversity element 400 and the compensating element 700 by the air gap 702, each component can be manufactured as an individual part. For example, the polarization diversity element 400 can be ordered from a first supplier, while the compensating element 700 can be ordered from a second supplier, and so forth.

It is well to note that when separating the polarization diversity element 400 from the compensating element 700 with the air gap 702, it may be necessary to apply coatings to one or both components. For example, in one embodiment the compensating element 700 is coated with an antireflective coating 703. Other coatings may be applied as required by a particular application.

In the embodiment of FIG. 7, the major faces 402,701 of the polarization diversity element 400 and compensating element 700 should be optically aligned. The major face 402 of the polarization diversity element 400 should optically "match" the major face 701 of the compensating element 700. Where these components are manufactured by different manufacturers, care must be taken that the tolerances are well controlled. FIG. 8 illustrates an embodiment that alleviates some of the issues associated with alignment.

Specifically, in FIG. 8, the polarization diversity element 400 and compensating element 700 are physically coupled together. The polarization diversity element 400 and compensating element 700 may be coupled together, in one embodiment, by an optical adhesive. As noted above, this adhesive can be a gap-filling isotropic material with approximately the same index of refraction as the isotropic compensating element, thereby alleviating the necessity of mechanically creating the complementary surface relief as this is accomplished by the gap-filling ability of the adhesive. Alternatively, the polarization diversity element 400 and compensating element 700 may be coupled together by an optical bonding process. The embodiment of FIG. 8, while slightly more complicated in initial manufacture, relieves the laser imaging system manufacturer of some of the alignment constraints associated with the embodiment of FIG. 7, and can be less costly overall.

Turning now briefly back to FIG. 3, while a birefringent material with a non-spatially varying orientation of the optical axis is one material suitable for manufacture of the polarization diversity element 300 in accordance with embodiments of the invention, as mentioned above, other materials can be used as well. For example, in another embodiment, the polarization diversity element 300 is manufactured from a polymerized liquid crystal layer. One such embodiment is shown in FIG. 9.

Turning now to FIG. 9, illustrated therein is one such embodiment where polymerized liquid crystal layer 901 can be used to manufacture the polarization diversity element 900. When using polymerized liquid crystal, the spatially varying polarization alteration pattern can be configured by altering a particular orientation 902 of the optical axes of the optical elements comprising polymerized liquid crystal.

As illustrated in FIG. 9, the polymerized liquid crystal layer 901 includes a plurality of mesogens 903 that each function as "oriented" optical elements. There are two independent planes of rotation of the mesogens that can be used to create a spatially varying index of refraction across a major face of the polarization diversity element 900.

In one embodiment, the mesogens can be rotated in a plane parallel to a major face of the polarization diversity element 900. This configuration presents a spatial variation in the index of refraction to a polarized input beam where the amount of local birefringence is constant, but the orientation of the axis of birefringence is spatially varied. Such an embodiment can be manufactured by creating an alignment layer that is spatially varying across the substrate to align the mesogens prior to polymerizing.

In another embodiment, the mesogens are rotated in a plane that is perpendicular to a major face of the polarization diversity element 900, thereby presenting a spatial variation in the index of refraction to a polarized input beam wherein the amount of local birefringence is spatially varying from a maximum birefringence when the axis of the mesogen is parallel to the major face, to a minimum birefringence when the axis of the mesogen is perpendicular to the major face. This configuration can be manufactured by aligning the mesogens with a spatially varying electric field as will be described below.

In the illustrative embodiment of FIG. 9, each mesogen 903 is oriented in accordance with a rotational function that varies in accordance with the spatially varying polarization alteration pattern across a major face 904 of the polarization diversity element 900. This variation of the orientation 902 results in an index of refraction that changes along the major face 904 in accordance with the spatially varying polarization alteration pattern. Said differently, by varying the orientation 902 across the major face 904, each mesogen 903 rotates by a particular amount corresponding to the spatially varying polarization alteration pattern. The result is a device where the orientation of the optical axis of birefringence is varied spatially, and is thereby capable of creating a transmitted beam 905 that comprises diverse polarization portions 906 from a polarized input beam 907 due to the spatially varied optical axis.

As with the polarization diversity element (400) of FIG. 4, the spatially varying polarization alteration pattern of the polarization diversity element 900 of FIG. 9 can correspond to differently varying patterns. For example, in one embodiment, the spatially varying polarization alteration pattern comprises one of a linear variation in the optical axis orientation of each mesogen 903 across the major face 904 of the polarization diversity element 900, or a non-linear variation in the optical axis orientation of each mesogen 903 across the major face 904 of the polarization diversity element 900. In another embodiment, the spatially varying polarization alteration pattern comprises one of a vortex variation in the optical axis orientation of each mesogen 903 across the major face 904 of the polarization diversity element 900, or a Hermite-Gaussian phase pattern variation in the optical axis orientation of each mesogen 903 across the major face 904 of the polarization diversity element 900. It will be clear to those of ordinary skill in the art having the benefit of this disclosure that the invention is not so limited. Other patterns can be used as well. These patterns can be optimized with computer simulation for a particular image projection system, or may be trimmed using experimental measurements to optimize speckle reduction while avoiding adverse affects upon spot size growth of the transmitted beam.

Figure 10:
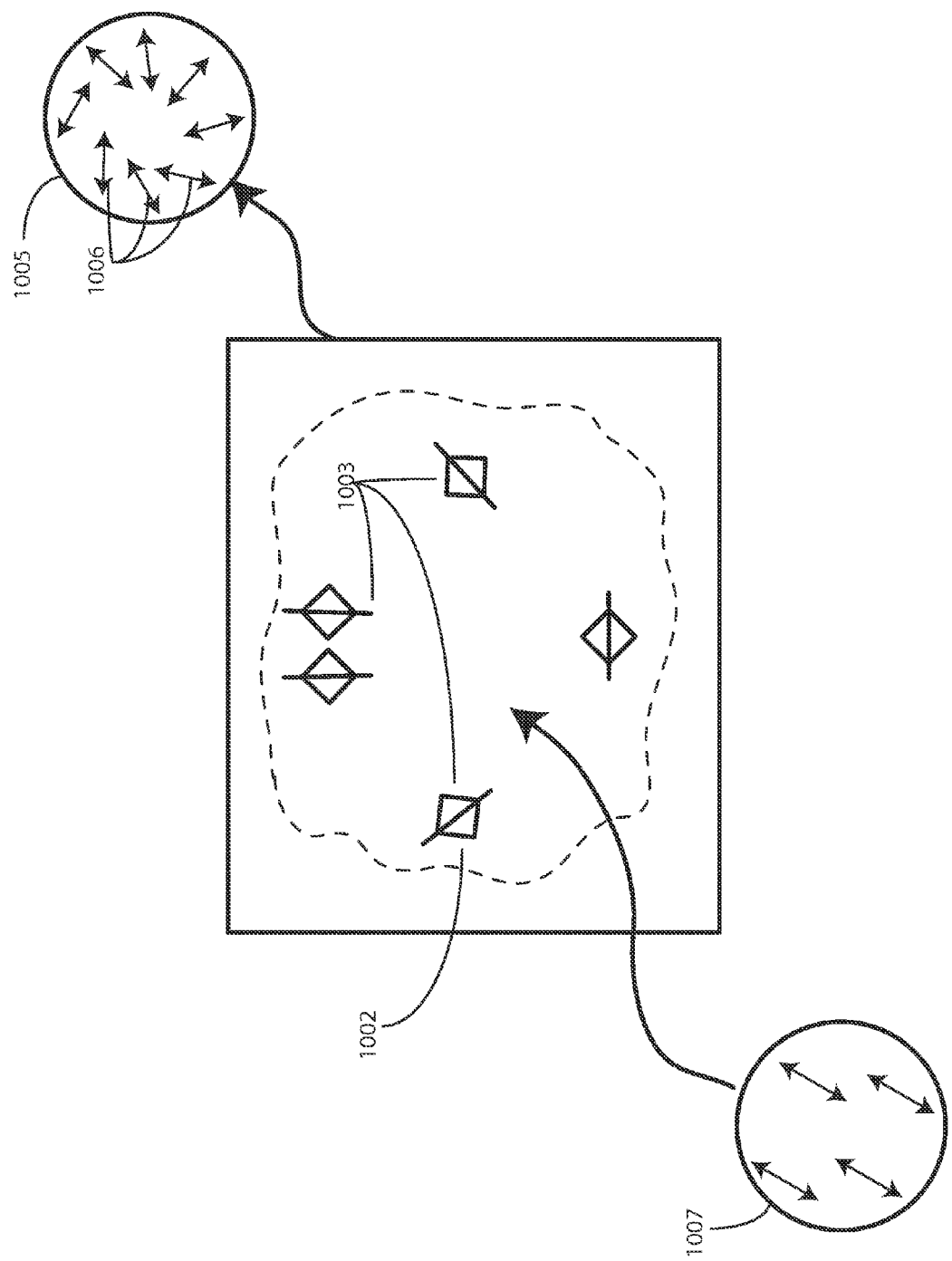
FIG. 10 illustrates another polarization diversity element in accordance with embodiments of the invention.

By way of example, turning now to FIG. 10, illustrated therein is another polarization diversity element 1000 using polymerized liquid crystal to create the spatially varying polarization alteration pattern. Note that the orientation 1002 of each mesogen 1003 of FIG. 10 differs from that shown in FIG. 9, even though both figures illustrate vortex-type variations. Nonetheless, the polarization diversity element 1000 of FIG. 10 functions just as that in FIG. 9 in that it receives an initially polarized, incident beam 1007 and delivers a transmitted beam 1005 having diverse polarization portions 1006 therein due to the variation in the optical axis orientation 1002 of the mesogens 1003. These diverse polarization portions 1006 work to reduce speckle appearing in images from image projection systems employing the polarization diversity element 1000.

Figure 11:
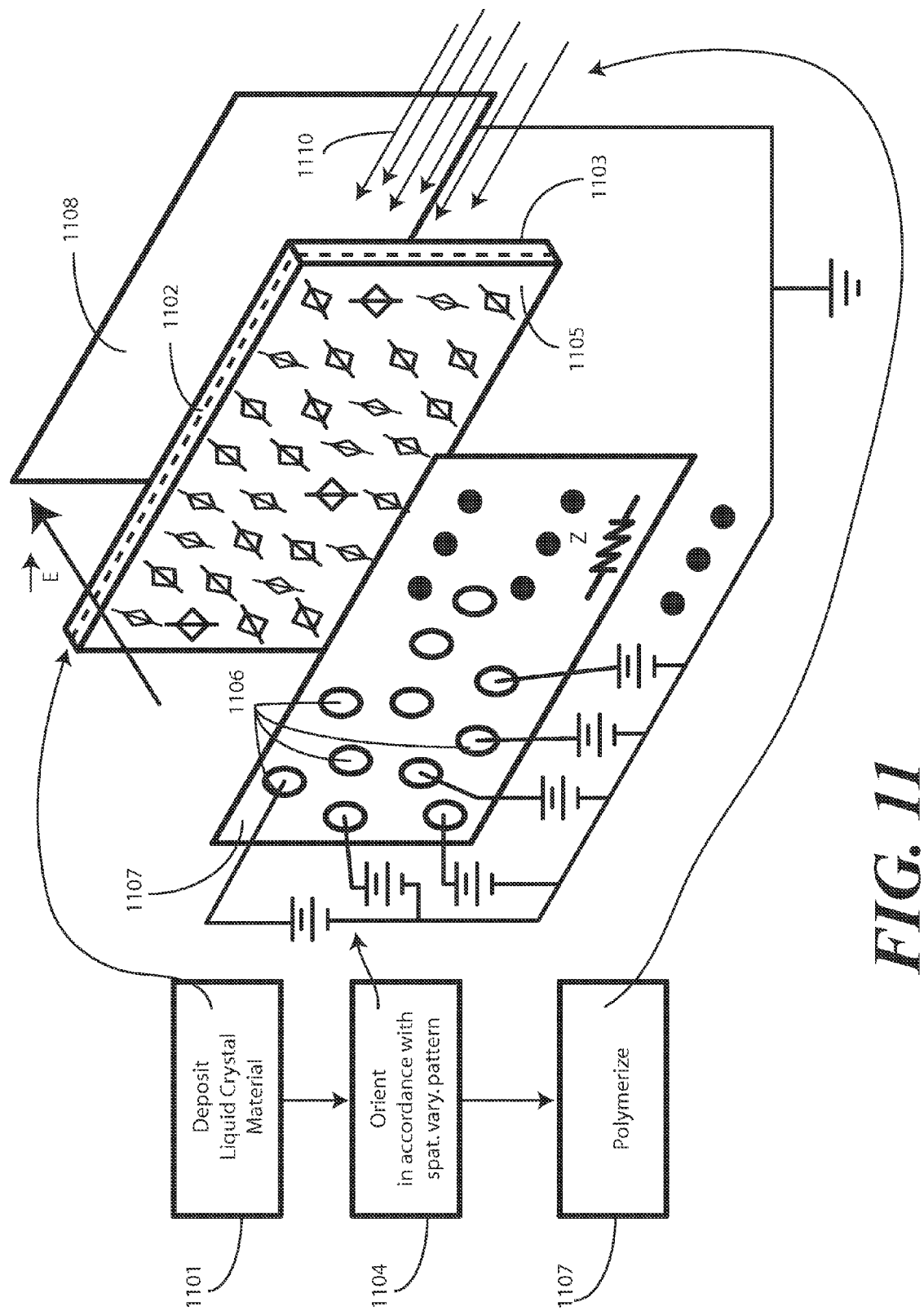
FIG. 11 illustrates an exemplary method of manufacturing polymerized liquid crystal layers in accordance with embodiments of the invention.

Turning now to FIG. 11, illustrate therein is one illustrative method of manufacturing the a polarization diversity element form polymerized liquid crystal material, such as those shown in FIGS. 9 and 10 above. The embodiment of FIG. 11 is illustrative only, as it will be clear to those of ordinary skill in the art having the benefit of this disclosure that the invention is not so limited.

As shown in FIG. 11, at step 1101, liquid crystal material 1102 comprising a plurality of rod-like mesogens is deposited on a substrate 1103. At step 1104, each of the plurality of mesogens is oriented in accordance with a spatially varying polarization alteration pattern that varies along a major face 1105 of the substrate 1103. In the illustrative embodiment of FIG. 11, the orientation is accomplished with the application of an electric field to the liquid crystal material 1102 by way of a series of electrodes 1106 coupled to a resistive plate 1107. In the embodiment of FIG. 11, the resistive plate 1107 is a uniform resistance layer, with resistance varying linearly with distance across the surface of the resistive plate 1107. The voltage applied to each electrode can vary such that the resulting electric field corresponds to the desired spatially varying polarization alteration pattern. The resistive plate 1107 "smoothes" the voltage differentials between each respective electrode. This places the mesogens of the liquid crystal material 1102 in a spatially varying electric field that exists between the electrode-induced voltage pattern on one side of the mesogens and a ground plate 1108 on another side. This causes the mesogens to rotate by an angle determined by the local electric field strength.

While varying the voltages of the electrodes is shown in FIG. 11, suitable rotation may also be obtained by applying a single voltage to a plate having a spatially varying resistance pattern. The spatially varying resistance pattern works to generate a spatially varying electric field that is similar to that generated by the electrodes 1106 of FIG. 11.

At step 1109, the liquid crystal material 1102 is polymerized. In the illustrative embodiment of FIG. 11, the liquid crystal material 1102 is polymerized by the application of ultraviolet light 1110 so as to fix the rotational orientations of each mesogen in accordance with the function.

Figure 12:
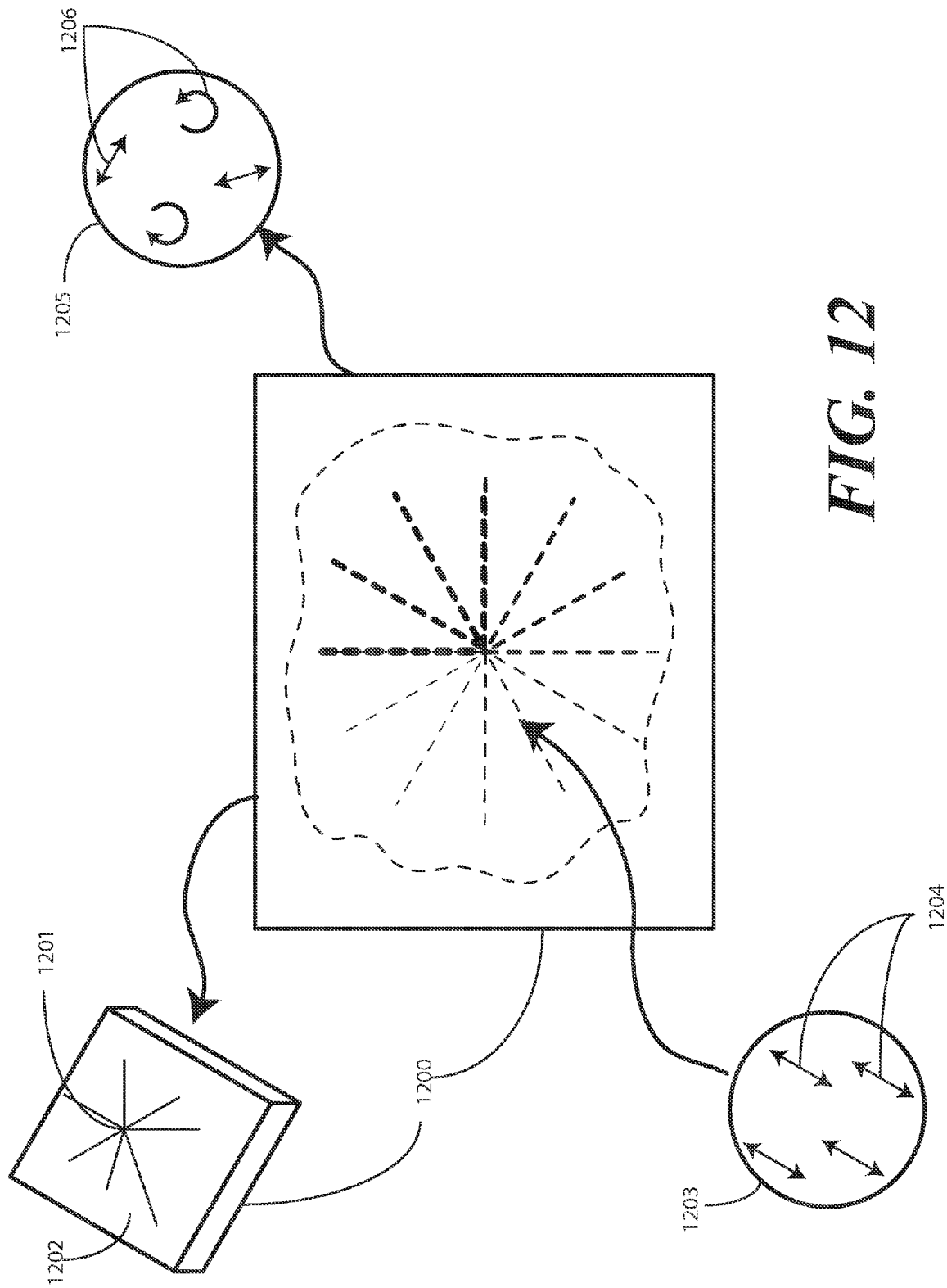
FIGS. 12-14 illustrate other polarization diversity elements in accordance with embodiments of the invention.

Turning now to FIG. 12, illustrated therein is a polarization diversity element 1200 manufactured from birefringent materials that employ a spatially varying polarization alteration pattern that is also a vortex-based variation. In the illustrative embodiment of FIG. 12, the spatially varying polarization alteration pattern has been formed by a vortex-type surface relief 1201 in a major face 1202 of the polarization diversity element 1200.

As shown in FIG. 12, the spatially varying polarization alteration pattern is a first order optical vortex in retardation, as the difference between the optical path length of the ordinary and extraordinary polarization axes varies with angle. For example, in FIG. 12 the vortex variation is configured such that retardation varies linearly with angle from zero to 2*pi. When an incident beam 1203 comprising polarized portions 1204 intersects the polarization diversity element 1200, the polarization diversity element "mixes" the polarization of those portions 1206 in the output beam 1205 so that the portions 1206 are heterogeneous, as shown in FIG. 12.

Figure 14:
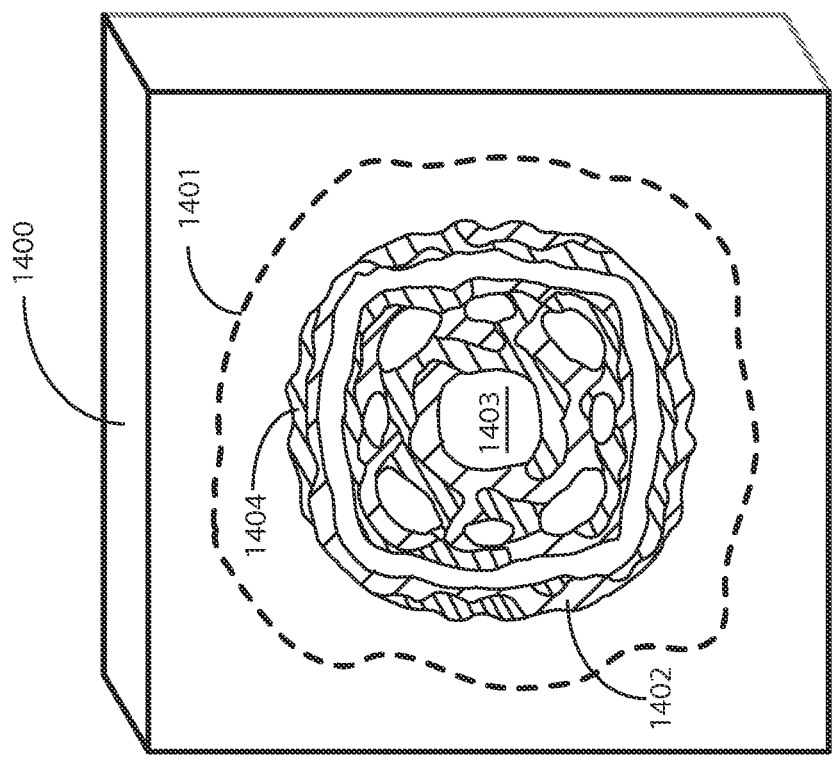
Figure 13:
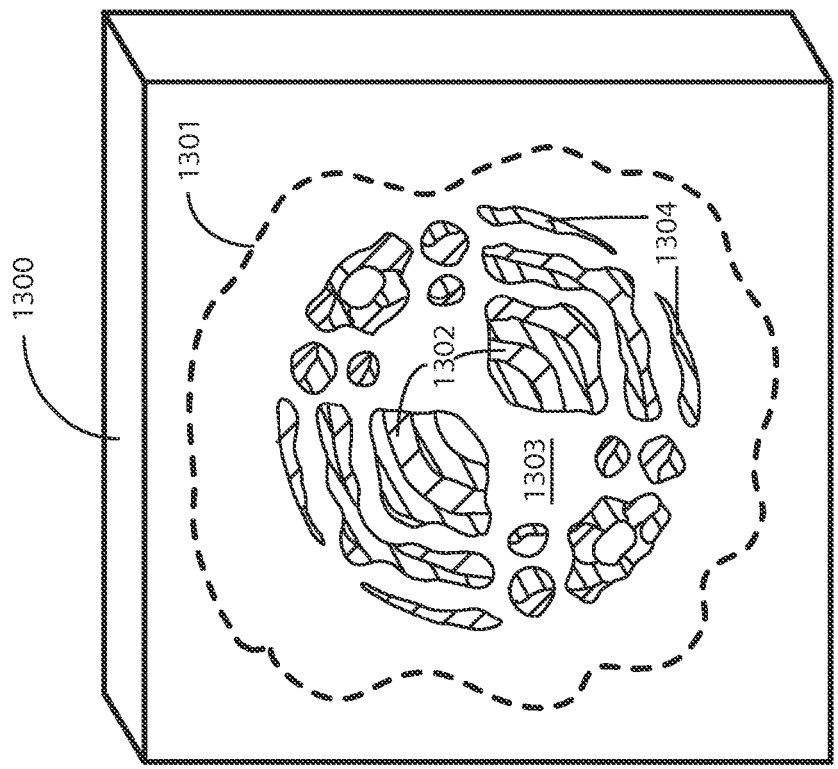

Turning now to FIGS. 13 and 14, illustrated therein are two additional spatially varying polarization alteration patterns 1301,1401 that are well suited for reducing speckle appearing in images that are displayed on a display surface from an image projection system. The spatially varying polarization alteration patterns 1301,1401 of FIGS. 13 and 14 are referred to as "Hermite-Gaussian" phase patterns because these spatially varying polarization alteration patterns 1301,1401 generate transmitted beams that are a close approximation to a Hermite-Gaussian mode in the far field.

As is known in the art, light propagating in a medium such as air has associated therewith an intensity profile. This intensity profile generally changes during propagation. For some configurations of the electric field associated with the light, which are known as modes, the amplitude profile remains fairly constant. For each beam, there is a family of Hermite-Gaussian modes that exist. The polarization diversity elements 1300,1400 of FIGS. 13 and 14 deliver transmitted beams that comprise approximations of these modes in the far field.

In the spatially varying polarization alteration patterns 1301,1401 of FIGS. 13 and 14 include portions 1302,1402 where there is no retardance (where the polarization diversity elements 1300,1400 are manufactured from birefringent materials) or no optical axis rotation (where the polarization diversity elements 1300,1400 are manufactured from polymerized liquid crystal material). Additionally, there are portions 1303,1403 where there is quarter-wave retardance (where the polarization diversity elements 1300,1400 are manufactured from birefringent materials) or ninety degree optical axis rotation (where the polarization diversity elements 1300,1400 are manufactured from polymerized liquid crystal material). There are also portions 1304,1404 where there is half-wave retardance (where the polarization diversity elements 1300,1400 are manufactured from birefringent materials) or one hundred and eighty degree optical axis rotation (where the polarization diversity elements 1300,1400 are manufactured from polymerized liquid crystal material). These patterns can further be optimized and refined, to suit a particular imaging system application, with computer simulation or experimental measurements to optimize speckle reduction while minimizing beam growth.

The spatially varying polarization alteration patterns 1301, 1401 of FIGS. 13 and 14 are useful with embodiments of the invention in that they provide desirable speckle reduction without causing excessive beam growth. Consequently, the image projection system in which they are used does not need to be significantly altered when employing these polarization diversity elements 1300,1400.

Figure 15:
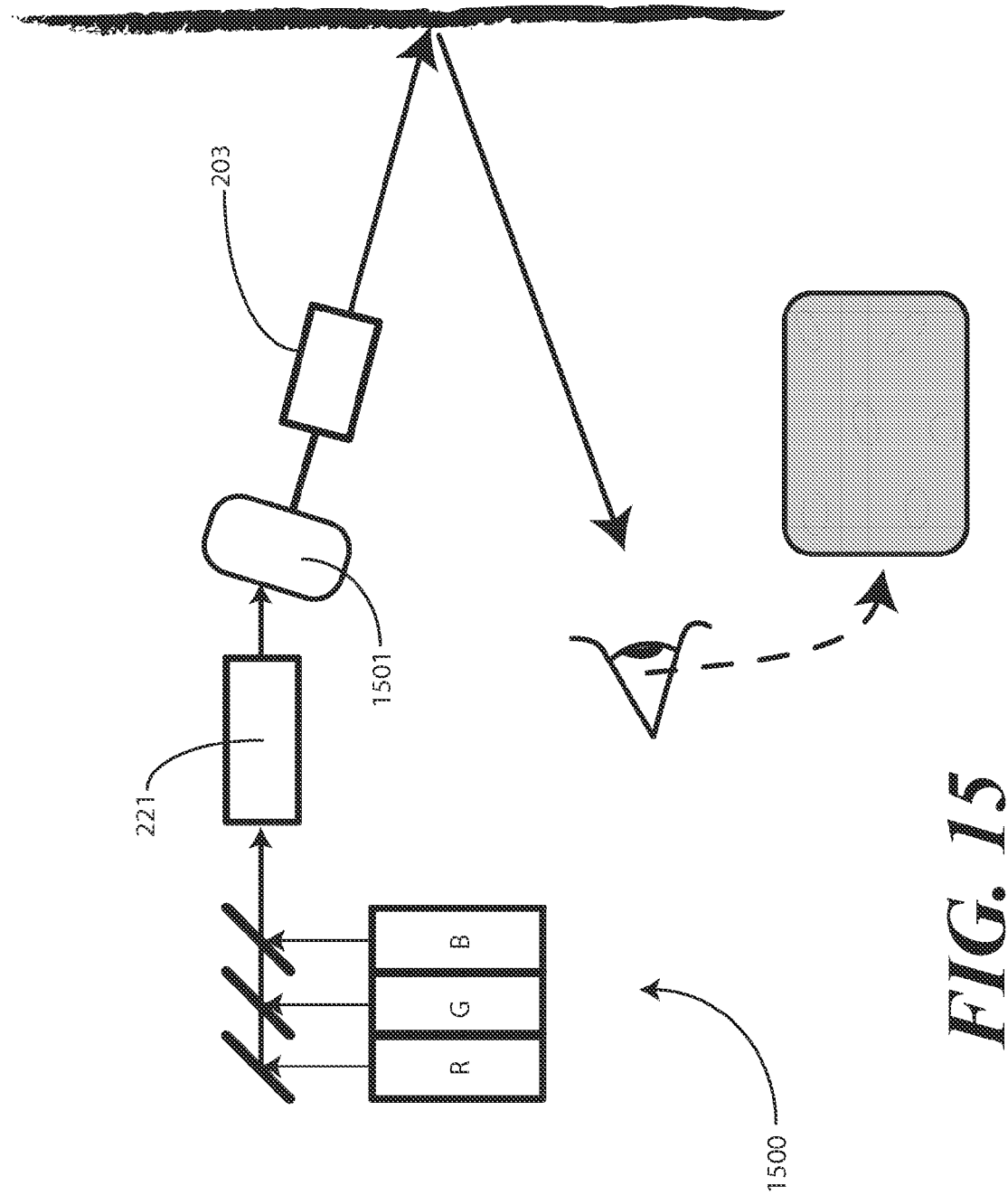
FIG. 15 illustrates a scanned laser projection system employing a polarization diversity element and a secondary speckle reduction technique in accordance with embodiments of the invention.

Embodiments of the present invention can be used with other known speckle reduction techniques to further reduce speckle occurring in projected images. By way of example, turning now to FIG. 15, illustrated therein is one embodiment of a scanned laser projection system 1500 employing a second speckle reduction device 1501 in conjunction with a polarization diversity element 221 to further reduce speckle.

The second speckle reduction device 1501 can take many forms. For example, in one embodiment it can be a rotating diffuser that temporally averages successive images created by the light modulator 203. Other temporal image-averaging devices configured to generate uncorrelated speckle patterns at the screen for each consecutive frame may also be used. Further, polarization switching modules, transverse phase modulation modules, static pseudo random couple phase modulation devices, or laser sources that are driven by high speed modulation devices may be used as second speckle reduction devices 1501.

Figure 16:
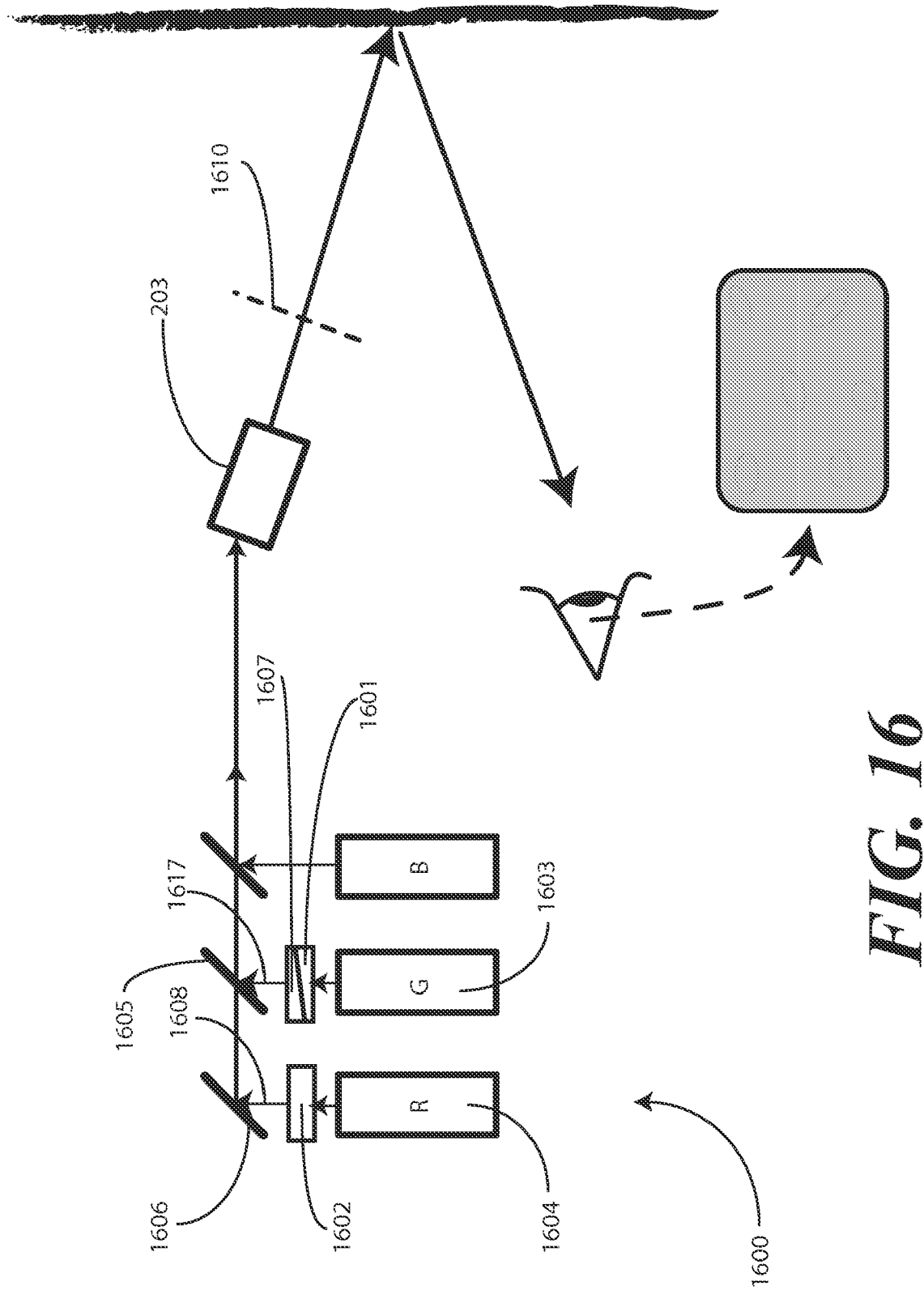
FIG. 16 illustrates another scanned laser projection system employing a polarization diversity element in accordance with embodiments of the invention.

Polarization diversity elements of embodiments of the present invention can also be used in varying locations within an image projection system. Recall from FIG. 2 above that the polarization diversity element (221) was disposed between the light sources (201) and the light modulator (203). In other embodiments of the invention, the polarization diversity element can be located in other locations. Turning now to FIG. 16, illustrated therein is one such embodiment. FIG. 16 is intended to be illustrative only, as it will be clear to those of ordinary skill in the art having the benefit of this disclosure that there are numerous other locations, or combinations of locations, where a polarization diversity element may be inserted as well.

In the illustrative embodiment of FIG. 16, a scanned laser imaging system 1600 employing multiple polarization diversity elements 1601,1602 is shown. Rather than using a single polarization diversity element, a first polarization diversity element 1601 has been used with a green laser 1603, while a second polarization diversity element 1602 has been used with the red laser 1604. Note that both polarization diversity elements 1601,1602 may be manufactured from birefringent materials. Alternatively, both polarization diversity elements 1601,1602 can be manufactured from polymerized liquid crystal materials. Of course, combinations of these can be used as well. Polarization diversity element 1601 may be manufactured from a birefringent material, while polarization diversity element 1602 may be manufactured from a polymerized liquid crystal layer, or vice versa.

As with the imaging system (200) of FIG. 2, optical alignment devices 1605, 1606 are optionally used to orient light from the laser sources 1603,1604 to the light modulator 203. In this illustrative embodiment, one polarization diversity element 1601 is being used to create a transmitted beam 1617 from the green laser source 1603 having diverse polarization components, while a second polarization diversity element 1602 is being used to create a transmitted beam 1608 having diverse polarization components from the red laser source 1604. Where the polarization diversity element 1601 is manufactured from birefringent materials, a corresponding compensating element, e.g., compensating element 1607, will be used to correct any optical aberration introduced by the polarization diversity element 1601.

The polarization diversity element locations of FIG. 16 are illustrative only, as there are numerous locations within an image projection system where the polarization diversity element could be located. In a scanned laser display, such as that shown in FIG. 16, the polarization diversity element may be placed either in the pupil plane or the image plane. Consequently, one or more polarization diversity elements may be placed at location 1610. In other types of image projection systems, such as digital light projection systems or liquid crystal on silicon systems, placement options may be more limited.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A passive polarization diversity element for use in an imaging system to reduce speckle, the polarization diversity element comprising:

a spatially and non-temporally varying polarization alteration pattern configured to alter a polarization of an homogeneously polarized incident laser beam by passively modulating portions of the incident laser beam to create a transmitted laser beam comprising diverse polarization portions, wherein the passive polarization diversity element comprises a birefringent crystal, wherein the spatially varying polarization alteration pattern comprises a spatially varying thickness of optically retarding elements across a major face of the passive polarization diversity element, wherein the spatially varying thickness of optically retarding elements is configured as a Hermite-Gaussian phase pattern varying an optical path length difference between an ordinary polarization axis and an extraordinary polarization axis of the passive polarization diversity element across the major face of the passive polarization diversity element; and a compensating element manufactured from an isotropic material configured to receive the transmitted laser beam, wherein the compensating element comprises a complementary major face to compliment the major face of the passive polarization diversity element, wherein the passive polarization diversity element and the compensating element are coupled together to form a unitary structure.

2. A scanned laser imaging system, comprising:

one or more laser sources configured to produce one or more homogenously polarized light beams;

a light modulator configured to produce images with the one or more homogenously polarized light beams; and a passive polarization diversity element disposed along an optical path of the one or more homogenously polarized light beams, the passive polarization diversity element comprising a spatially and non-temporally varying polarization alteration pattern along a major face configured to passively alter polarizations of portions of the one or more homogenously polarized light beams to create one or more transmitted beams each having diverse polarizations so as to reduce speckle appearing when the images are displayed on a display surface, wherein the passive polarization diversity element comprises a birefringent crystal, wherein the spatially varying polarization alteration pattern comprises a spatially varying thickness of optically retarding elements across a major face of the passive polarization diversity element, wherein the spatially varying thickness of optically retarding elements is configured as a Hermite-Gaussian phase pattern varying an optical path length difference between an ordinary polarization axis and an extraordinary polarization axis of the passive polarization diversity element across the major face of the passive polarization diversity element; and a compensating element manufactured from an isotropic material configured to receive the transmitted laser beam, wherein the compensating element comprises a complementary major face to compliment the major face of the passive polarization diversity element, wherein the passive polarization diversity element and the compensating element are coupled together to form a unitary structure.

3. The scanned laser imaging system of claim 2, wherein the passive polarization diversity element is disposed:

between at least one of the one or more laser sources and the light modulator and is configured to receive light from the at least one of the one or more laser sources and a polarization diverse light beam to the light modulator; or between the light modulator and the display surface.

4. The scanned laser imaging system of claim 2, wherein the passive polarization diversity element is disposed in one of a pupil plane of the scanned laser imaging system or an image plane of the scanned laser imaging system.

5. The scanned laser imaging system of claim 2 wherein the spatially varying polarization alteration pattern varies one of linearly, non-linearly, radially, or randomly.

* * * * *